United States Patent Office 3,291,757
Patented Dec. 13, 1966

3,291,757
TETRAHYDROQUINOXALINES AS ANTI-OZONANTS FOR RUBBER
Buddy Sturm, Jr., Tallmadge, and Farris H. Wilson, Jr., Silver Lake, Ohio, assignors to The Goodyear Tire & Rubber Company, Akron, Ohio, a corporation of Ohio
No Drawing. Filed Dec. 26, 1963, Ser. No. 333,708
12 Claims. (Cl. 260—45.8)

This invention relates to the preservation of articles made of natural or synthetic rubber, and more particularly concerns the provision of inhibitors to protect such rubbers from the deleterious effects of aging.

Unsaturated rubbers, whether natural or synthetic, cured or uncured, are vulnerable to the effects of aging. By and large, this occurs as a result of prolonged exposure to atmospheric oxygen and traces of ozone generated by sunlight. Aging manifests itself in rubbers by the scission of polymer chains, with a resultant decrease in rubber tensile strength, flexibility and ability to withstand even moderate stretching without cracking.

To mitigate against the effects of aging, various inhibitors are known and, indeed, widely used. An ideal inhibitor, if such is attainable, would be effective in small amounts against both oxygen- and ozone-induced aging. While in most cases an anti-ozonant is also an anti-oxidant, the converse is decidely untrue, and there are even known instances of anti-ozonants being pro-oxidants.

An ideal inhibitor should also be compatible, both physically and chemically, with the rubber base stock. Physically, it should not separate as an immiscible solid phase, which could detract from the physical strength and esthetic appearance of rubber products. Chemically, the inhibitor should not induce "scorch," or over-cure, during vulcanization, and in other respects should not detract from the utility of rubber components.

An ideal aging inhibitor should also possess a broad spectrum of activity, being usable with natural as well as synthetic rubbers. Further, it should function as a metal deactivator to inhibit against the pro-oxidant effect of trace heavy metals. Moreover, the inhibitor should be acceptable from a commercial standpoint, that is, be prepared from available raw materials, be low in cost, and be non-toxic.

It has now been discovered, according to the invention, that rubbers may be protected against oxygen and ozone degradation by incorporating therein a small amount of certain tetrahydroquinoxalines which approach the criteria of an ideal inhibitor to an unusually high degree. Essentially, the inhibitors of the invention are tetrahydroquinoxalines having the structural formula:

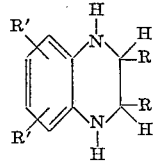

where the R groups are radicals selected from hydrogen and the same or different alkyl, cycloalkyl, aralkyl, alkenyl and aryl groups, and where the R' radicals are selected from hydrogen and the same or different alkyl, cycloalkyl, aralkyl, alkenyl, aryl, alkoxy and aryloxy groups. Certain compounds of the foregoing structure, particularly those having a substituent on the 6 position are outstanding.

An unusual feature of the present invention is that the tetrahydroquinoxalines which are derivatives of ortho-phenylene diamines are among the most effective inhibitors ever tested. This contrasts with many statements in the literature to the effect that ortho-phenylenediamines are significantly less active as inhibitors than the isomeric para-phenylenediamines.

The rubbers which may be protected against oxygen and ozone degradation in accordance with this invention are natural rubber and those synthetic rubbery polymers of conjugated dienes, all of which are normally susceptible to deterioration by sunlight and atmospheric oxygen. By the term "rubbery conjugated diene polymers" as employed herein, is meant both natural rubber and the synthetic rubber-like polymers and co-polymers of conjugated dienes. Representative examples of synthetic rubbery polymers of conjugated dienes include: polychloroprene; polyisoprene having essentially all of its units combined in a cis-1,4 structure (Mayor, et al., Rubber and Plastic Age, volume 39, No. 11, page 938, 1958); polybutadiene having essentially all of its units combined in a cis-1,4 structure (Crouch, Rubber and Plastic Age, March 1961, pages 276–282); the rubbery co-polymers of butadiene and styrene which may contain from 50 to 90% or more of butadiene; butyl rubber, a co-polymer of a major proportion of a mono-olefin and a minor proportion of a multi-olefin such as butadiene or isoprene; terpolymers of octadiene or dicyclopentadiene with ethylene and propylene; and co-polymers of acrylonitrile and butadiene. All of the foregoing polymers have residual unsaturation which renders them vulnerable to aging.

Inhibitors of the invention may be incorporated in rubbers at varying concentrations, depending on the nature of the rubber base stock, the expected environment of use and the required degree of protection. In general, concentrations ranging from as low as about 0.025 part by weight per 100 parts of rubber polymer, to as high as about 10 parts per 100 parts are advantageously used. When it is desired to afford long term protection in severe applications, for example in vehicle tires, the preferred range is from about 0.05 to about 4 parts per 100 parts.

The inhibitors may be incorporated into rubbers in any customary manner. They may be added in the form of physical mixtures or in the form of emulsions, using any of the known emulsifiers such as monovalent metal hydroxides, fatty acids, organic soaps, etc. They may be added to rubbers which in the form of latex, or they may be milled into coagulated rubbers in the usual manner.

A wide range of specific compounds is available within the structural formula given above. The R radicals can be hydrogen or one or more alkyl, cycloalkyl, aralkyl, alkenyl, or aryl radicals. Illustrative examples of such radicals include: alkyl such as methyl, ethyl, propyl, butyl, pentyl, hexyl, octyl, decyl, hexadecyl, octadecyl and isomers thereof; cycloalkyl, such as cyclopropyl, cyclopentyl, methyl cyclopentyl, cyclohexyl, cycloheptyl and cyclooctyl; aralkyl such as benzyl and methylbenzyl; aryl such as phenyl, tolyl, xylyl, diphenyl and naphthyl; alkenyl such as propenyl, butenyl and pentenyl. Similarly, the R' radicals may be hydrogen or the same or different alkyl, cycloalkyl, aralkyl, alkenyl, aryl, alkoxy, or aryloxy radicals, substituted at either the 5, 6, 7, and/or 8 position. In addition to the examples given in conjunction with the R radical, the R' substituent may be methoxy, ethoxy, propoxy, phenoxy, naphthoxy, etc.

The present inhibitors may be prepared by a variety of techniques, as exemplified in the examples below. For example, they may be prepared by simple reduction of the corresponding quinoxaline with hydrogen gas at a pressure of about 100–2000 p.s.i.g. and a temperature between about 100 and 300° C., in the presence of a hydrogenation catalyst such as nickel, platinum, or palladium. Alternatively, reduction may be effected at temperatures below about 100° C. by using lithium aluminum hydride, or equivalent chemical reducing agents.

The invention, in its various aspects, is illustrated by the following examples, which are intended to be illustrative and hence not wholly definitive with respect to scope or conditions.

EXAMPLE I

This example illustrates the preparation of tetrahydroquinoxaline (in the structural formula R and R' are all hydrogen).

54.5 grams quinoxaline, 350 ml. isopropyl alcohol solvent, and 2 grams 65% nickel metal on kieselguhr hydrogenation catalyst (Girdler G-49A) are placed in a one liter stainless steel autoclave equipped with a stirrer, thermocouple and hydrogen source. Hydrogen gas is introduced and maintained at 500 p.s.i.g. pressure for 45 min. at 130–140° C. After reaction, the autoclave is depressured and cooled, catalyst is filtered off and the product distilled in vacuo. The distillate is dissolved in hot toluene and, upon cooling, yields 20 grams of product melting at 94.5–97° C. The nitrogen content is 21.0%; theory 20.9 weight percent.

EXAMPLE II

This example illustrates the preparation of 2,3-dimethyl tetrahydroquinoxaline (the R's are methyl and the R"'s are hydrogen).

79 grams 2,3-dimethylquinoxaline, 400 ml. isopropyl alcohol solvent, and 2 grams 65% nickel on kieselguhr catalyst are charged to the autoclave of Example I. Reduction is effected at 130–135° C. under 1000 p.s.i.g. hydrogen pressure for 5½ hours. 28.5 grams of product melting at 112–114° C. is obtained by recrystallization. Nitrogen found is 17.1 weight percent; theory 17.0%.

EXAMPLE III

This example illustrates the preparation of 6-methyl-1,2,3,4-tetrahydroquinoxaline (in the structural formula, one R' is 6-methyl while the other R' and both R's are hydrogen).

62 grams of 6-methylquinoxaline, 300 ml. isopropyl alcohol, and 3 grams of 65% nickel on kieselguhr catalyst are charged to the autoclave of Example I. After two hours at 750 p.s.i.g. hydrogen and 105–110° C. the catalyst is filtered off and 41 grams of 6-methyl-1,2,3,4-tetrahydroquinoxaline is obtained by distillation from the reaction mixture. Product is recrystallized from benzene, and melts at 104–105.5° C. Its nitrogen content is 18.89–18.96 weight percent; theory is 18.9%.

EXAMPLE IV

This example illustrates the preparation of 6-methoxy-1,2,3,4-tetrahydroquinoxaline (in the formula, one R' is 6-methoxy while all other substituents are hydrogen).

16 grams of lithium aluminum hydride suspended in 1500 ml. of anhydrous ether is charged to a five-liter three-necked flask equipped with stirrer, thermometer and condenser. 41.5 grams of 6-methoxyquinoxaline dissolved in 1100 ml. of anhydrous ether is added to the suspension drop wise over two hours. The mixture is refluxed at 35° C. for 31 hours. 50 ml. of distilled water is added and the pot mixture filtered and dried over calcium chloride (Drierite) overnight. The Drierite is filtered off and the solution evaporated to dryness. 21 grams of 6-methoxy-1,2,3,4-tetrahydroquinoxaline remains. After desiccating overnight, the material melts at 77–78.5° C. and contains 17.22 weight percent nitrogen; theory is 17%.

Dilute solution viscosity test

The efficiency of ozone degradation inhibitors is determined by conducting dilute solution viscosity (DSV) tests using natural rubber (pale crepe) as a base rubber in which to evaluate the various inhibitors. Retention of viscosity of a carbon tetrachloride solution of the rubber after exposure to a mixture of oxygen and ozone is taken as a measure of anti-ozonant efficiency.

The DSV tests are carried out in accordance with the general procedure outlined in the article by Delman, Simms and Allison, Analytical Chemistry, vol. 26, pages 1589–1592 (1954). Essentially this procedure comprises preparing a master batch solution of 0.8 gram of the base rubber in 100 milliliters of carbon tetrachloride solution. Portions of the master batch solution are then diluted with additional carbon tetrachloride to obtain solutions containing 0.2 gram of rubber per 100 milliliters of solution. The inhibitors to be evaluated for anti-ozonant efficiency are introduced to separate portions of the above described dilute solution in the proportion of 4 parts per 100 parts of rubber. A stream of ozonized oxygen is then passed through the dilute solutions and their viscosity determined at selected intervals using a Cannon-Fenski-Ostwald type viscometer.

The anti-ozonant efficiency of the inhibitor is calculated by employing the following equation:

$$\text{Anti-ozonant efficiency percent} = \frac{100(B-A)}{C-A}$$

where:

$A$ = DSV of additive-free control after ozonolysis
$B$ = DSV of additive-containing solutions after ozonolysis
$C$ = initial DSV of additive-free control before ozonolysis Results are then converted to a common basis (to allow for sporadic variations in crepe rubber compositions or in experimental conditions) by relating the anti-ozonant efficiency of an inhibitor to that of a standard inhibitor.

The data obtained are summarized below:

TABLE

| Example | Compound | Relative Anti-ozonant Efficiency |
|---|---|---|
|  | Mixed Diaryl-P-Phenylenediamine Standard. | 100 |
| III | 6-methyl-1,2,3,4-Tetrahydroquinoxaline | 201 |
| IV | 6-methoxy-1,2,3,4-Tetrahydroquinoxaline | 234 |

Synthetic rubber oxidation test

A vulcanizate of oil-extended styrene-butadiene rubber (a copolymer of 25% styrene and 75% butadiene, extended with 37.5 parts of hydrocarbon oil per 100 parts by weight of polymer) is employed as a base rubber to determine the effectiveness of ozonization inhibitors under accelerated aging conditions.

The following rubber formulation is used:

| Ingredients: | Parts by weight |
|---|---|
| Cold oil extended styrene-butadiene rubber | 137.50 |
| High abrasion furnace black | 68.75 |
| Stearic acid | 2.0 |
| Hydrocarbon processing oil | 5.0 |
| Zinc oxide | 3.0 |
| Benzothiazyldisulfide | 1.0 |
| Sulfur | 1.75 |
| Diphenylguanidine | 0.2 |
| Inhibitor | 4.0 |

Sheets of the above rubber are cured for 60 minutes at 285° F. (140° C.). Test strips, one-half inch by six inches by 0.80 inch, are prepared for ozone testing and placed in an ozone chamber continuously charged with oxygen containing 50 parts per 100 million ozone.

For the static test, a strip is extended by 10% and maintained at that elongation for 48 hours at 100° F. (38° C.). In the dynamic test, a strip is flexed from 0 to 10% elongation at a rate of 60 flexes per minute, again for 48 hours at 100° F. (38° C.).

At the conclusion of the test period, samples are rated on a scale of: 0 indicating no cracking, 1 indicating light cracking, 2 is medium cracking, 3 is heavy cracking and 4 is severe cracking or breaking. Control samples, containing no inhibitor, rate 4 under both static and dynamic conditions. A test sample (Example II) contains 4.0 parts of 2,3-dimethyltetrahydroquinoxaline, rates 1 under static conditions and 2 under dynamic conditions.

In addition to the compounds discussed above, the following exemplary 1,2,3,4-tetrahydroquinoxaline derivatives may be employed: 6-methyl, 6-methoxy, 5-methyl, 5-methoxy, 5-phenethyl, 6-phenethyl, 5-cyclohexyl, 6-cyclohexyl, 5-phenyl, 6-phenyl, 5-ethyl, 6-ethyl, 5-ethoxy, 6-ethoxy, 6 o, m, or p tolyl, 5 o, m, or p tolyl, 5-butoxy, 6-butoxy, any of the 5-methoxyphenyls, any of the 6-methoxyphenyls, 5-secbutyl, 6-secbutyl, etc. The above may be repeated, using 2,3-dimethyl, 2,3-diethyl, or other 2,3-di symmetrically substituted tetrahydroquinoxalines. Similarly, the list may be repeated, but using 2-methyl, 2-ethyl, etc., tetrahydroquinoxalines, or tetrahydroquinoxalines with the addition of substituents at the 7 and 8 positions.

Thus, there has been provided an outstanding class of aging inhibitors for natural and synthetic rubbers. While the invention has been described in conjunction with specific embodiments, these are for illustrative purposes only. Accordingly, many alternatives, modifications, and variations will be apparent to those skilled in the art, and it is intended to embrace all such alternatives, modifications and variations as fall within the spirit and broad scope of the appended claims.

We claim:

1. A rubbery, conjugated diene polymer normally susceptible to oxygen and ozone degradation and containing, in an amount sufficient to inhibit such degradation, a tetrahydroquinoxaline having the structure:

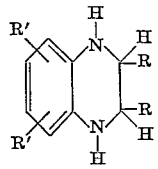

wherein R is a radical selected from hydrogen, alkyl, cycloalkyl, aralkyl, alkenyl, and aryl and wherein R' is a radical selected from hydrogen, alkyl, cycloalkyl, aralkyl, alkenyl, aryl, alkoxy and aryloxy.

2. Polymer of claim 1 wherein said R are each hydrogen and wherein said R' are each hydrogen.
3. Polymer of claim 1 wherein said R are each hydrogen and wherein one of said R' is alkyl while the other is hydrogen.
4. Polymer of claim 3 wherein said alkyl is methyl.
5. Polymer of claim 4 wherein said methyl is in the 6 position.
6. Polymer of claim 1 wherein said R are both hydrogen and wherein one of said R' is alkoxy while the other is hydrogen.
7. Polymer of claim 5 wherein said alkoxy is methoxy.
8. Polymer of claim 7 wherein said methoxy is in the 6 position.
9. Polymer of claim 1 wherein said R are each alkyl and wherein said R' are each hydrogen.
10. Polymer of claim 9 wherein said alkyl is methyl.
11. A vehicle tire comprising the rubbery, conjugated diene polymer of claim 1.
12. A method of inhibiting oxygen and ozone degradation of a rubbery conjugated diene polymer normally susceptible to such degradation which comprises incorporating in such polymer an amount effective to inhibit such degradation, of a tetrahydroquinoxaline having the structure

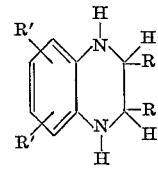

wherein R is a radical selected from hydrogen, alkyl, cycloalkyl, aralkyl, alkenyl, and aryl, and wherein R' is a radical selected from hydrogen, alkyl, cycloalkyl, aralkyl, alkenyl, aryl, alkoxy and aryloxy.

No references cited.

LEON J. BERCOVITZ, *Primary Examiner.*

H. E. TAYLOR, *Assistant Examiner.*